(12) United States Patent
Takei et al.

(10) Patent No.: US 10,222,077 B2
(45) Date of Patent: Mar. 5, 2019

(54) DUST REMOVING APPARATUS AND NOTIFICATION METHOD

(71) Applicant: Panasonic Intellectual Property Management Co., Ltd., Osaka (JP)

(72) Inventors: Ichiro Takei, Tokyo (JP); Hiroyuki Kayama, Osaka (JP); Hiroki Taoka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 92 days.

(21) Appl. No.: 15/212,148

(22) Filed: Jul. 15, 2016

(65) Prior Publication Data

US 2017/0028333 A1 Feb. 2, 2017

(30) Foreign Application Priority Data

Jul. 30, 2015 (JP) ................................. 2015-150315

(51) Int. Cl.
*F24F 3/16* (2006.01)
*F24F 11/30* (2018.01)
*F24F 110/50* (2018.01)
*F24F 110/64* (2018.01)
*F24F 11/39* (2018.01)

(52) U.S. Cl.
CPC ............ *F24F 3/1603* (2013.01); *F24F 11/30* (2018.01); *F24F 11/39* (2018.01); *F24F 2110/50* (2018.01); *F24F 2110/64* (2018.01); *Y02A 50/25* (2018.01)

(58) Field of Classification Search
CPC .......... B01D 46/00; B01D 50/00; B03C 3/00; A61L 9/00; A61L 9/16

USPC ....... 55/385.2, DIG. 34; 95/273; 96/16, 417, 96/422, 424, 397; 422/4
See application file for complete search history.

(56) References Cited

U.S. PATENT DOCUMENTS

| 5,085,134 A | * | 2/1992 | Hofstra | .................... A24F 47/00 454/344 |
| 6,660,070 B2 | * | 12/2003 | Chung | ................. B01D 46/008 55/385.2 |
| 2001/0049926 A1 | * | 12/2001 | Davies | ..................... B08B 5/02 55/385.2 |

(Continued)

FOREIGN PATENT DOCUMENTS

JP 2006-057919 3/2006

*Primary Examiner* — Duane Smith
*Assistant Examiner* — Minh-Chau Pham
(74) *Attorney, Agent, or Firm* — Greenblum & Bernstein, P.L.C.

(57) ABSTRACT

A dust removing apparatus is provided. An air blower performs air blowing in a space. A processor determines a first period in which a user is absent in the space. An air sucker collects dust by performing air suction from the space during the first period. A sensor measures an amount of dust collected by performing the air suction in the space during the first period. The processor determines whether or not a usage status of the dust removing apparatus in the space is appropriate based on a comparison between the measured amount of dust collected in the first period and an estimated amount of dust, which is estimated to be collected under a usage condition in which the user is absent in the space, and outputs information indicating whether or not a usage status of the dust removing apparatus is appropriate based on a result of the comparison.

14 Claims, 6 Drawing Sheets

(56) References Cited

U.S. PATENT DOCUMENTS

2003/0041573 A1* 3/2003 Davies ................. B08B 5/02
                                                                 55/385.2
2010/0047115 A1* 2/2010 Krichtafovitch ......... A61L 9/16
                                                                  422/4

\* cited by examiner

| AMOUNT OF HEAVY COLLECTED DUST $d_H$[g] / SIZE OF ROOM | $d_H < 0.7$[g] | $0.7 \leq d_H < 1.0$[g] | $1.0$[g]$\leq d_H$ |
|---|---|---|---|
| ~ 10 m² | AVERAGE | AVERAGE | GOOD |
| 10 m² ~ 16.6 m² | BAD | AVERAGE | GOOD |
| 16.6 m² ~ | AVERAGE | AVERAGE | GOOD |

FIG. 6

| AMOUNT OF LIGHT COLLECTED DUST $d_L$[g] / SIZE OF ROOM | $d_L < 0.2$[g] | $0.2 \leq d_L < 0.3$[g] | $0.3$[g]$\leq d_L$ |
|---|---|---|---|
| ~ 10 m² | AVERAGE | AVERAGE | GOOD |
| 10 m² ~ 16.6 m² | BAD | AVERAGE | GOOD |
| 16.6 m² ~ | BAD | BAD | GOOD |

DUST REMOVING APPARATUS AND NOTIFICATION METHOD

BACKGROUND

1. Technical Field

The present disclosure relates to a dust removing apparatus that removes dust deposited on a person or an object or dust floating in the air, and a notification method.

2. Description of the Related Art

Conventionally, numerous technologies for removing dust in the air (hereinafter referred to as "dust removal") with an air current exist, and they are applied to dust removing apparatuses such as air purifiers or air conditioners. The dust removing apparatuses are provided with sensors such as a dust sensor or a pollen sensor, and control a dust removal process based on the sensing result (see Patent Literature 1, for example).

CITATION LIST

Patent Literature

PTL1: Japanese Patent No. 3952309

SUMMARY

However, depending on the status of use in a room where the above dust removing apparatus is placed, the dust removing apparatus cannot exhibit its intrinsic performance, so that the dust collection efficiency might be deteriorated.

Thus, a non-limiting exemplary embodiment of the present disclosure provides a dust removing apparatus and a notification method that can notify a user of whether or not a status of use of the dust removing apparatus is appropriate. Additional benefits and advantages of the disclosed embodiments will be apparent from the specification and Figures. The benefits and/or advantages may be individually provided by the various embodiments and features of the specification and drawings, and need not all be provided in order to obtain one or more of the same.

In one general aspect, the techniques disclosed here feature: a dust removing apparatus including an air blower which, in operation, performs air blowing; an air sucker which, in operation, performs air suction from a space in which the air blowing is performed to collect dust from the space; a sensor which, in operation, measures an amount of the collected dust, the amount of dust indicating a density of the collected dust; a processor which, in operation, determines whether or not a usage condition of the dust removing apparatus in the space is appropriate by comparing the measured amount of collected dust with an estimated value of an amount of collected dust under a usages condition of the dust removing apparatus satisfying a predetermined appropriate use criteria upon the measurement of the amount of collected dust; and an outputter which, in operation, outputs information indicating the result of the determined usage condition.

These general and specific aspects may be implemented using a device, a system, a method, and a computer program, and any combination of devices, systems, methods, and computer programs.

According to one aspect of the present disclosure, whether or not the status of use of the dust removing apparatus is appropriate can be notified to a user.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

DETAILED DESCRIPTION

Exemplary embodiments according to the present disclosure will be described in detail with reference to the drawings.

Notably, in the description below, "dust" indicates fine particulate matters which are likely to be deposited on the surface of a person or an object or likely to float in the air, such as dust or pollen, and also indicates matters that are preferably removed from a predetermined area from which dust is to be removed, such as a room.

Further, in the description below, dust is classified into "light dust" and "heavy dust".

"Light dust" indicates matters that keep on floating in the air without freely falling onto a floor or the like even in a stable state in which an air current in the space hardly varies. Examples of "light dust" include matters having a diameter of less than about 10 µm, such as PM 2.5.

"Heavy dust" indicates matters that freely fall onto a floor or the like without keeping on floating in the air in a stable state in which an air current in the space hardly varies. "Heavy dust" also indicates dust that is stirred up in the air with the activity of a person (such as the movement in a room) when it is settled on a floor, for example, but remains on a floor almost without being stirred up in the air with air blowing from later-described dust removing apparatus 100. Examples of "heavy dust" include matters having a diameter of not less than about 10 µm, such as pollen and fiber waste.

Notably, the particle diameter of 10 µm used as the standard (corresponding to a first threshold) for the classification between light dust and heavy dust is merely one example, and the standard is not limited to this value. Light dust and heavy dust may be classified according to the performance of dust removing apparatus 100 (for example, according to whether or not dust stirs up in the air with air blowing).

In the description below, an "amount of dust" indicates the density of dust in a space (for example, room). For example, it indicates an amount [g] of dust per 1 m$^3$.

First Exemplary Embodiment

[Configuration of Dust Removing Apparatus 100]

Figure 1:
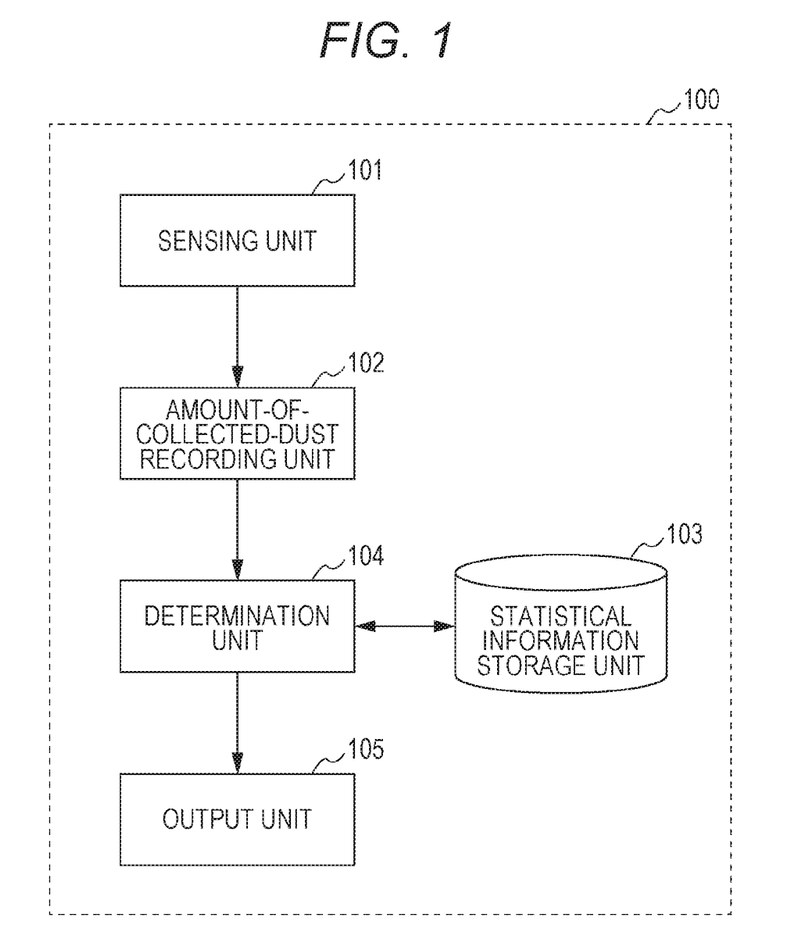
FIG. 1 illustrates one example of a configuration of a dust removing apparatus according to a first exemplary embodiment.

FIG. 1 is a block diagram illustrating one example of a configuration of a dust removing apparatus according to the present exemplary embodiment.

Dust removing apparatus 100 performs air blowing for generating an air current, and sucks air in the space (room in the description below) in which air blowing is performed, thereby collecting dust in the air in the room. Dust removing apparatus 100 is an air purifier installed in the room, for example. It is supposed that a user can change the installment position of dust removing apparatus 100.

In FIG. 1, dust removing apparatus 100 includes sensing unit 101, amount-of-collected-dust recording unit 102, statistical information storage unit 103, determination unit 104, and output unit 105.

Sensing unit 101 measures (senses) an amount of collected dust indicating an amount of dust (density) collected by dust removing apparatus 100. For example, sensing unit 101 is a sensor that measures an amount of collected dust using light. A sensor that electrically or chemically detects dust deposited on a filter (not illustrated) provided to dust removing apparatus 100 is used as this sensor. The sensor includes a dust sensor that can detect both of or one of light dust and heavy dust, and a pollen sensor that detects pollen on the basis of a shadow generated with light. Sensing unit 101 outputs the measured amount of collected dust to amount-of-collected-dust recording unit 102.

Amount-of-collected-dust recording unit 102 adds up amounts of collected dust during a predetermined period input from sensing unit 101, and records the result of the addition (hereinafter sometimes referred to as collected dust log). The amount-of-collected-dust recording unit 102 may record, as the collected dust log, the result of the addition during the predetermined period and the air blowing patter during this period in association with each other. An air blowing patter may be represented by the combination of air volume, direction of air, air blowing timing, air blowing time, and the like. Amount-of-collected-dust recording unit 102 outputs the recorded information to determination unit 104.

Amount-of-collected-dust recording unit 102 may also record the collected dust log in association with layout information indicating the size or shape of the room from which dust is to be removed. The layout information indicating the size or shape of the room may manually be input by a user through an input interface, or may automatically be acquired from a distance sensor (not illustrated). The size of the room is not limited to be recorded by amount-of-collected-dust recording unit 102. The size may be estimated by determination unit 104 (the detail will be described below).

Statistical information storage unit 103 stores statistical data of an amount of collected dust measured for every usage condition under which dust removing apparatus 100 is placed, the usage condition including an air blowing pattern, a size of a room, and a layout in the room.

The statistical data includes information converted into a format which is usable for the determination of how much intrinsic dust collection performance of dust removing apparatus 100 is actually exhibited (specifically, dust collection efficiency), on the basis of the amount of collected dust measured in air blowing with various air blowing patterns in rooms of various sizes. Specifically, the statistical data represents an estimated value of an amount of collected dust with dust removing apparatus 100 under an appropriate status of use (for example, installment position) for every usage condition (combination of a size of a room, air blowing pattern, etc.) of dust removing apparatus 100. For example, the statistical data includes data representing how much dust and what type of dust (light dust or heavy dust) is collected (amount of collected dust) in what type of room (size and layout), when dust removing apparatus 100 is activated in what air blowing pattern under an appropriate status of use. The statistical data may also include data (amount of collected dust) of different seasons. For example, the statistical data may include data corresponding to whether or not other air current controller (air conditioner, electric fan, exhaust fan, etc.), which is expected to be used according to the season, is used.

Determination unit 104 acquires the statistical data, which has a usage condition (air blowing pattern, the size of the room, etc.) identical to that upon the measurement of the amount of collected dust with sensing unit 101, from statistical information storage unit 103 on the basis of the information input from amount-of-collected-dust recording unit 102. Then, determination unit 104 compares the measured value of the amount of collected dust input from amount-of-collected-dust recording unit 102 and the statistical data of the amount of collected dust input from statistical information storage unit 103, and determines whether or not the current status of use (the installment position of dust removing apparatus 100 in this case) of dust removing apparatus 100 in the room is appropriate. In other words, determination unit 104 determines whether or not dust removing apparatus 100 is efficiently activated.

For example, for light dust, determination unit 104 determines whether the status of use of dust removing apparatus 100 is appropriate or not using the amount of collected dust measured during the period of absence of a user. For heavy dust, determination unit 104 determines whether the status of use of dust removing apparatus 100 is appropriate or not using the amount of collected dust measured during the period which is started from the timing at which a user enters a room which has been unoccupied. The detail of the determination process with determination unit 104 will be described below.

Output unit 105 displays information based on the determination result (whether the status of use of dust removing apparatus 100 is appropriate or not) input from determination unit 104. For example, output unit 105 may indicate that the current installment position of dust removing apparatus 100 is inappropriate or appropriate. Output unit 105 may also indicate in which direction dust removing apparatus 100 has to be moved to enhance efficiency. Output unit 105 may also indicate the optimal installment position of dust removing apparatus 100, in the case where the layout of the room is recognized.

Notably, a lamp or a display is used as the output interface used for the display on output unit 105. In dust removing apparatus 100, the method for notifying the user of the information based on whether or not the status of use of dust removing apparatus 100 is appropriate, which information is determined by determination unit 104, is not limited to the display of the information. For example, output unit 105 may output the information with sound, the information being based on whether or not the status of use of dust removing apparatus 100 is appropriate, and being determined by determination unit 104. In addition, dust removing apparatus 100 may output information to an external device (portable device or other display device) with communication function or the like to notify the user of the information through the external device.

Although not illustrated, dust removing apparatus 100 includes a CPU (Central Processing Unit), a memory medium such as a ROM (Read Only Memory) storing a control program, and a work memory such as a RAM (Random Access Memory). Dust removing apparatus 100 may also include a communication circuit for cooperation with other devices or connection to network such as cloud. Although not illustrated, dust removing apparatus 100 also includes an air fan which is controllable by the CPU, an air outlet port, and an intake port, for example. In this case, the functions of the components described above are implemented through execution of the control program by the CPU.

[Operation of Dust Removing Apparatus 100]

Next, the operation of dust removing apparatus 100 described above will be described in detail.

Figure 2:
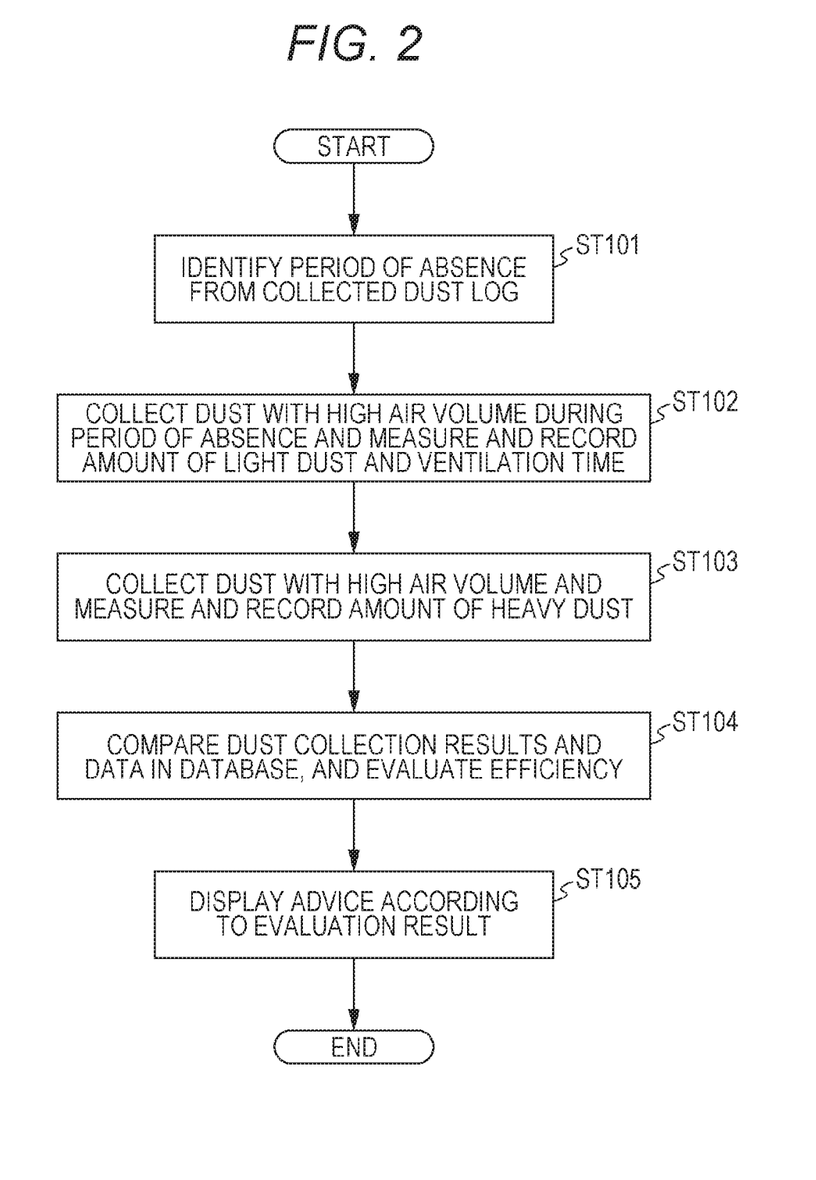
FIG. 2 is a flowchart illustrating one example of an operation of the dust removing apparatus according to the first exemplary embodiment.

FIG. 2 is a flowchart illustrating one example of the operation of dust removing apparatus 100.

In FIG. 2, in step (hereinafter referred to as "ST") 101, determination unit 104 identifies the period of absence of a user from the room from which dust is to be removed, using the collected dust log input from amount-of-collected-dust recording unit 102. Determination unit 104 also identifies the timing at which the user enters the room, which has been unoccupied and from which dust is to be removed, using the collected dust log input from amount-of-collected-dust recording unit 102.

For example, determination unit 104 analyzes the user's tendency of presence in the room and absence from the room using the collected dust log during a predetermined period (for example, one week) recorded in amount-of-collected-dust recording unit 102.

Generally, when a user is present in the room and in action, dust settled on the floor is stirred up in the air, so that the amount of dust in the air increases. Therefore, the amount of collected dust measured by dust removing apparatus 100 tends to increase. On the other hand, when a user is absent from the room, the air current in the room is small, so that heavy dust in the air falls on the floor or the like and the amount of dust in the air decreases. Therefore, the amount of collected dust by dust removing apparatus 100 tends to decrease.

In the light of the above tendency, the "period of absence" identified by determination unit 104 indicates the period of the state in which the air current in the room is stable with less variation and in which heavy dust falls and is settled on the floor or the like. In other words, during the "period of absence", much light dust and less heavy dust are present in the air. Here, the "period of absence" in the present specification is not necessarily limited to the case where a user is absent from the room in a strict sense, but may include the case in which dust in the air in the room is expected to be in the state similar to the case where a user is absent from the room.

At the "timing at which the user enters the room" identified by determination unit 104, the state of the room is changed from the state in which heavy dust falls and is settled on the floor or the like during the period of absence to the state in which heavy dust is stirred up in the air with the entrance of the user.

One example of the method for identifying the period of absence of the user and the method for identifying the timing at which the user enters the room will be described below.

Figure 3:
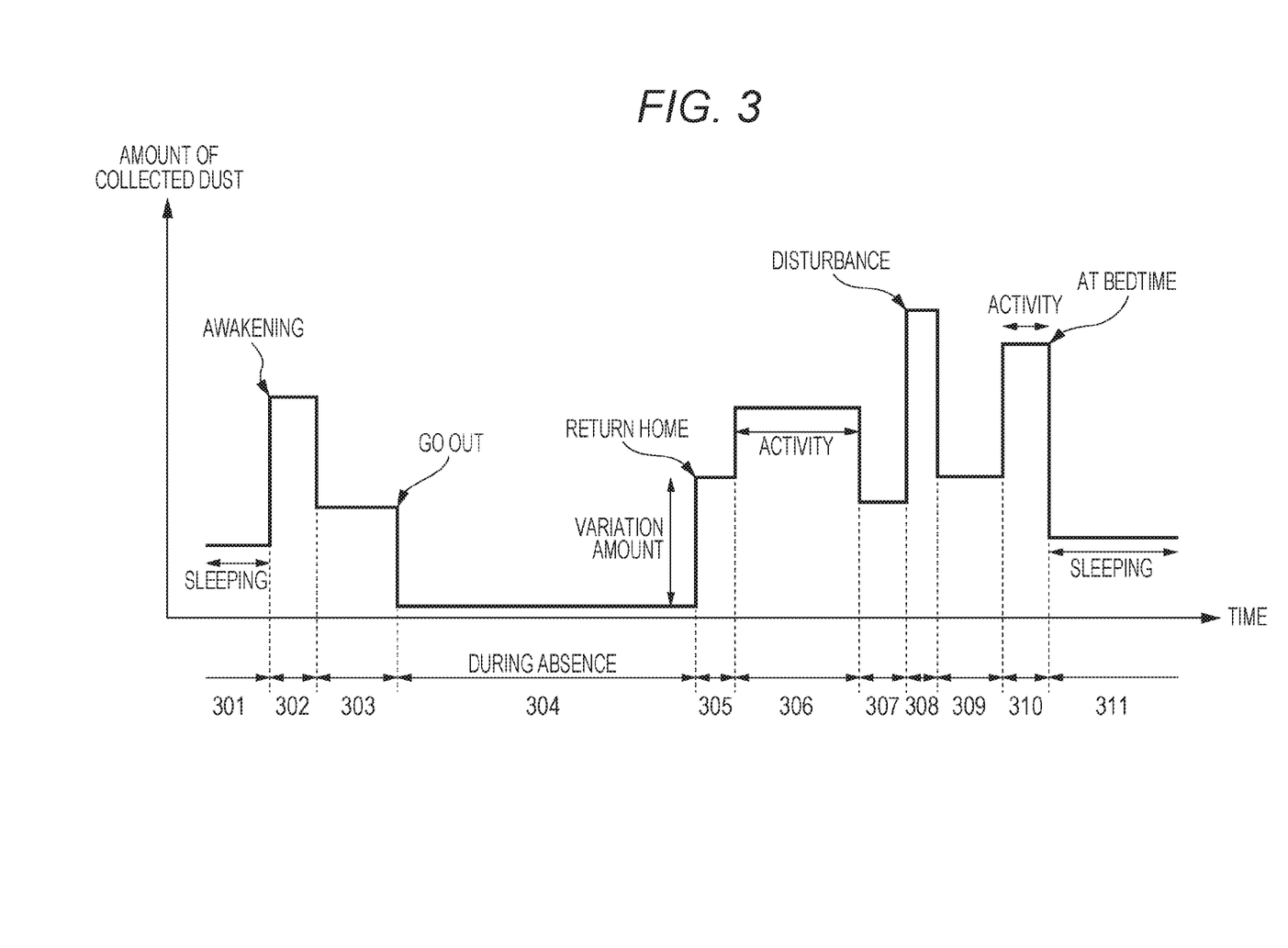
FIG. 3 illustrates one example of a change in a daily amount of collected dust recorded by the dust removing apparatus according to the first exemplary embodiment.

FIG. 3 is a diagram illustrating one example of a daily change in an amount of collected dust recorded by amount-of-collected-dust recording unit 102. Notably, in FIG. 3, it is supposed that the user lives and performs usual activities in the room from which dust is to be removed by dust removing apparatus 100.

As illustrated in FIG. 3, the user is sleeping during periods 301 and 311, so that the user performs less activity. Thus, the amount of collected dust is relatively small. During periods 302, 303, and 305 to 310, the user is in action in the room, so that the amount of collected dust relatively increases. The amount of collected dust during these periods varies based on disturbance to dust removing apparatus 100 caused by other air current controllers, such as an air conditioner or electric fan, or by an open window, and activities (for example, movement or opening/closing of window) of the user. For example, it is found from FIG. 3 that the amount of dust sharply increases at the time of awakening or before bedtime, since pollens or the like deposited on bedding such as a comforter or a blanket are simultaneously stirred up in the air due to the action of pulling out and putting away the bedding.

As described above, during the period in which disturbance or user's activities occur, the amount of collected dust by dust removing apparatus 100 varies depending on the factors other than dust removing apparatus 100. Therefore, it is preferable that the influence exerted on the amount of collected dust due to the disturbance and user's activities is eliminated in evaluating how much intrinsic performance of dust removing apparatus 100 is exhibited (dust collection efficiency). Specifically, it is preferable to evaluate the dust collection efficiency of dust removing apparatus 100 during the period of absence of the user in which the disturbance and user's activities are expected not to occur.

In view of this, as for the identification of the period of absence of the user, period 304 illustrated in FIG. 3 is firstly considered.

It is found that, during period 304, the amount of collected dust is much smaller than the other periods. This is considered because the user is out and heavy dust falls on the floor or the like, and therefore, the amount of dust in the air is decreased. That is, period 304 includes the period in which the amount of collected dust in the air becomes the minimum in one day.

Therefore, determination unit 104 identifies the period including the time period in which the amount of collected dust becomes the minimum in the collected dust log as the period of absence. For example, determination unit 104 may detect the timing (time period) at which the amount of collected dust becomes the minimum, and identify, as the period of absence, the period which is successive before and after the detected time period and has an amount of collected dust smaller than the multiple of a predetermined number (for example, a value twice the minimum) of the minimum value of the amount of collected dust.

Determination unit 104 performs the identification of the period of absence to the collected dust log for one week, for example. With this, the precision in estimating the period of absence, which is identified as the period in which the air current in the room becomes stable in one day (in which the user is highly likely absent in one day), can be enhanced. For example, determination unit 104 may identify the overlapped periods out of the periods estimated as the period of absence in each day as the period of absence which is used for evaluation of the dust collection efficiency described below.

Dust removing apparatus 100 can precisely measure the amount of collected light dust by performing the dust collection process during the period of absence.

Next, as for the timing at which the user enters the room, period 305 illustrated in FIG. 3 is considered.

When the user returns home and enters the room, dust settled on the floor during the period of absence (period 304) is stirred up in the air due to the movement of the user or the variation in the air current caused by the action of opening and closing a door. Thus, the amount of collected dust increases during period 305. Dust removing apparatus 100 sucks dust stirred up at this timing, resulting in that the amount of collected heavy dust sharply increases.

Therefore, determination unit 104 identifies the timing at which the user enters the room on the basis of the temporal change in the amount of collected dust. For example, determination unit 104 identifies, as the time at which the user returns home (as the timing at which the user enters the room), the timing (start timing of period 305 in FIG. 3) at which an instantaneous variation (increase) of the measured amount of collected dust becomes equal to or larger than a predetermined threshold (corresponding to a third threshold) from the state in which the amount of collected dust is extremely small (the state in which the amount of collected dust is less than a predetermined threshold (corresponding to a second threshold), e.g., the period of absence). For example, determination unit 104 may set the average of the differences (variations) between the amount of collected dust during the period of absence (period 304) and the amount of collected dust at the time at which the user returns home (period 305) in the collected dust log for one week as the threshold for identifying the time at which the user returns home.

As described above, determination unit 104 identifies the timing at which the sharp increase in the amount of collected heavy dust is confirmed after the period in which the user is absent (after the state in which the amount of collected light dust and the amount of collected heavy dust are both extremely small) as the timing at which the user enters the room. Dust removing apparatus 100 starts the measurement at this timing. Thus, dust removing apparatus 100 is capable of precisely measuring the amount of collected heavy dust settled on the floor surface during the period of absence.

One example of the method for identifying the period of absence of the user and the method for identifying the timing at which the user enters the room has been described above.

Returning to FIG. 2, sensing unit 101 measures the amount of light dust present in the air in the room in ST102. Specifically, sensing unit 101 performs the dust collection process with air blowing in a high air volume (for example, the maximum air volume) during the period of absence of the user identified in ST101, and measures the amount of collected dust.

As described above, during the "period of absence" identified in ST101, heavy dust completely falls and is settled on the floor. Further, it is considered that heavy dust settled on the floor is hardly stirred up in the air with the air blowing from dust removing apparatus 100 in ST102. Therefore, sensing unit 101 can precisely measure the amount of collected dust including "light dust" present in the air but not including "heavy dust" through the dust collection process during the period of absence identified in ST101.

Further, sensing unit 101 can measure the amount of collected light dust through the dust collection process during the period of absence of the user, excluding the influences exerted by the user's activities (movement or the action of opening/closing the door) or air current caused by other air current controllers (for example, an air conditioner or an electric fan) which are activated when the user is in the room.

The amount of collected dust measured in ST102 is recorded as "the amount of light dust" by amount-of-collected-dust recording unit 102.

The period in which dust removing apparatus 100 performs air blowing with a high air volume in ST102 may be a predetermined period (for example, 30 minutes) after the timing at which the amount of collected dust becomes equal to or lower than a predetermined threshold during the period of absence of the user identified in ST101, for example.

In addition, in ST102, determination unit 104 measures the time (hereinafter sometimes referred to as "ventilation time") required for collecting (sucking) dust in the entire room for estimating the size of the room in which dust removing apparatus 100 is installed.

Figure 4:
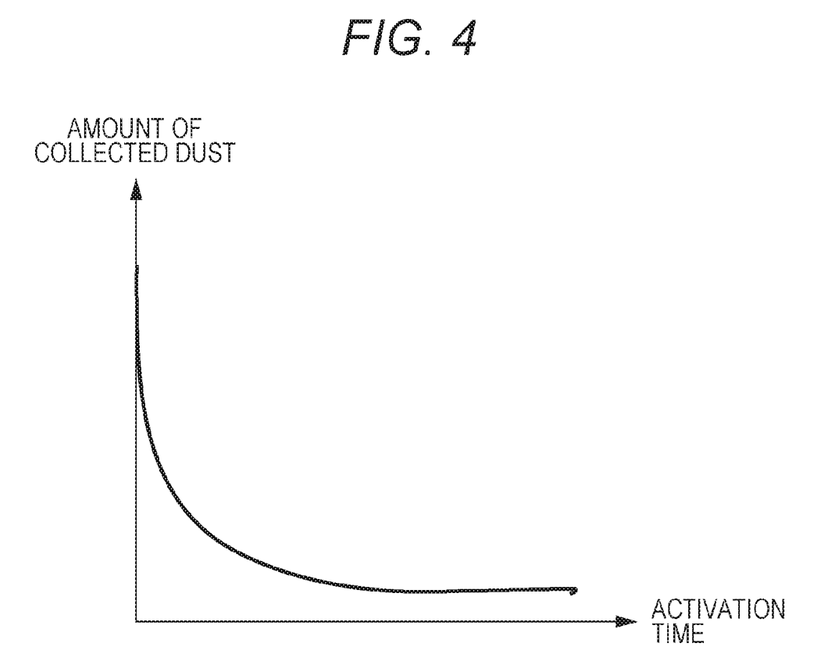
FIG. 4 illustrates one example of a temporal change in an amount of collected dust with the dust removing apparatus according to the first exemplary embodiment.

FIG. 4 is a graph illustrating how the amount of collected dust is changed with the activation time, when dust removing apparatus 100 continues air blowing. As illustrated in FIG. 4, when dust removing apparatus 100 continues air blowing with a high air volume for a certain period of time, the amount of collected dust converges (approaches asymptotically) to a predetermined amount, although it does not become zero. When the amount of collected dust reaches the predetermined amount, the degree of reduction of the amount of collected dust after that becomes extremely small (hereinafter sometimes referred to as "convergence state"). This convergence state can be recognized as the state in which dust in the air can mostly be removed, though it is not completely removed, by dust removing apparatus 100.

Notably, it is supposed that the dust collection efficiency is bad depending on the current installment position of dust removing apparatus 100. The convergence speed of the amount of collected dust relative to the activation time in FIG. 4 is different depending on whether the dust collection efficiency of dust removing apparatus 100 is good or bad. However, the amount of collected dust finally converges to the similar amount. That is, whether the dust collection efficiency of dust removing apparatus 100 is good or bad less affects the precision in estimating a size of a room.

The time required from the start of the activation till the convergence state is established is in relation to a size of a room and an air volume of dust removing apparatus 100. If it is supposed that air in a room is sequentially sucked by dust removing apparatus 100, and the air once sucked is not again sucked by dust removing apparatus 100, the relationship between the time (ventilation time) required to suck all air in the room and both the size of the room and the air volume of dust removing apparatus 100 can be represented as follows.

$$\text{(ventilation time)[min]} = \text{(size of room)[m}^3\text{]}/\text{(air volume of air purifier)[m}^3/\text{min]}$$

Actually, the air once sucked by dust removing apparatus 100 may sometimes be sucked again. Therefore, the actual relationship among the above parameters is not equal to the above equation. However, it can be considered that, in a real situation, there is a proportional relationship between a size of a room and the time required for dust collection with respect to a certain air volume of dust removing apparatus 100. Determination unit 104 can estimate the size of a room using a ventilation time and an air volume of dust removing apparatus 100 according to the following equation on the basis of the above aspect.

(size of room)[m³]∝(air volume of air purifier)[m³/min]×(ventilation time)[min]

In this way, determination unit 104 estimates the size of the room on the basis of the time required until the amount of dust measured from the timing at which the user is absent from the room becomes less than a predetermined threshold (corresponding to a fourth threshold) (convergence state) and the air volume of dust removing apparatus 100 at that time. The estimation of the size of the room by determination unit 104 during the period in which the user is absent can eliminate the influence caused by the user's activities or other air current controllers, whereby the precision in estimating the size of the room can be enhanced. Note that the size of the room may be input by the user. With this, the precision in evaluating the dust collection efficiency can further be enhanced.

Returning to FIG. 2, sensing unit 101 measures the amount of heavy dust present in the air in the room in ST103. As described above, heavy dust settled on the floor or the like is hardly stirred up in the air with the air blowing from dust removing apparatus 100. However, such heavy dust is considered to be stirred up in the air due to the user's activities. Therefore, sensing unit 101 performs the dust collection process with air blowing in a high air volume (for example, the maximum air volume) for a certain period of time at the timing at which the user enters the room, which timing is identified in ST101, and measures the amount of collected dust.

For example, as illustrated in FIG. 4, "light dust" present in the air during the absence of the user is mostly removed by dust removing apparatus 100. Therefore, the amount of dust settled on the floor during the absence of the user is considered to be proportional to the total amount of heavy dust. Specifically, it is supposed that the dust collected by dust removing apparatus 100 at the timing at which the user enters the room is largely composed of "heavy dust" settled on the floor during the absence of the user. Thus, sensing unit 101 can precisely measure the amount of collected "heavy dust".

It is also supposed that the user's activities and the activation status of other air current controllers at the timing at which the user enters the room are almost in the same level every time. Specifically, since dust removing apparatus 100 starts the measurement of the amount of collected dust at the timing at which the user enters the room, dust removing apparatus 100 can measure the amount of collected heavy dust with the influence with the user's activities being reduced compared to the other timings.

Notably, the user who enters the room may be detected using a motion sensor such as a pyroelectric sensor. In this case, precise detection of a person is enabled. Therefore, dust removing apparatus 100 performs air blowing with high air volume at the timing of the entrance of the user, and measures the amount of collected dust. With this, dust removing apparatus 100 can precisely measure the amount of collected heavy dust.

In ST104, determination unit 104 compares the amount of collected dust measured in ST102 and ST103 and the statistical data recorded in statistical information storage unit 103 (database) to determine whether or not the current installment position of dust removing apparatus 100 is appropriate. That is, determination unit 104 evaluates the dust collection efficiency of dust removing apparatus 100 at the installment position.

Firstly, determination unit 104 acquires the size of the room estimated in ST102 and the statistical data (amount of collected dust) corresponding to the air blowing pattern in ST102 and ST103 from statistical information storage unit 103. Statistical information storage unit 103 stores statistical data of amounts of collected dust (amounts of collected light dust and amounts of collected heavy dust) measured with the same method as in ST102 and ST103 in rooms of various sizes. This statistical data indicates a normal amount of collected dust in a room with a corresponding size. Therefore, determination unit 104 uses the statistical data as an estimated value (criterion value) of an amount of collected dust under an appropriate status of use of dust removing apparatus 100 at the time of measurement of the amount of collected dust. Determination unit 104 compares the statistical data and the measured amount of collected dust to determine whether the status of use of dust removing apparatus 100 is appropriate or not. That is, the "appropriate" status of use means the status in which the difference between the criterion based on the statistical data or the like and the measured amount of collected dust falls within a predetermined range.

Specifically, determination unit 104 compares the statistical data concerning the acquired amount of collected light dust and the amount of collected dust measured in ST102 (the amount of collected dust measured in the period of absence identified in ST101), thereby evaluating the dust collection efficiency of dust removing apparatus 100 for light dust. Also, determination unit 104 compares the statistical data concerning the acquired amount of collected heavy dust and the amount of collected dust measured in ST103 (the amount of collected dust measured in the period started from the timing at which the user enters the room which has been unoccupied), thereby evaluating the dust collection efficiency of dust removing apparatus 100 for heavy dust.

Figure 5:
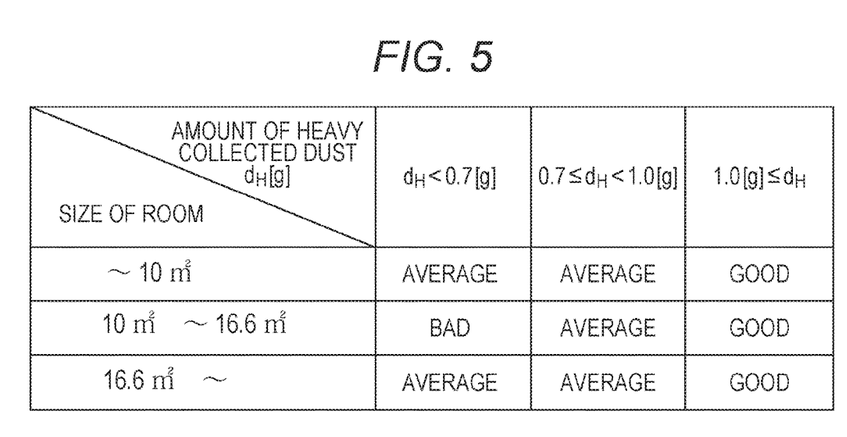
FIG. 5 illustrates the relationship among a size of a room, an amount of heavy dust, and dust collection efficiency of the dust removing apparatus according to the first exemplary embodiment.
Figure 6:
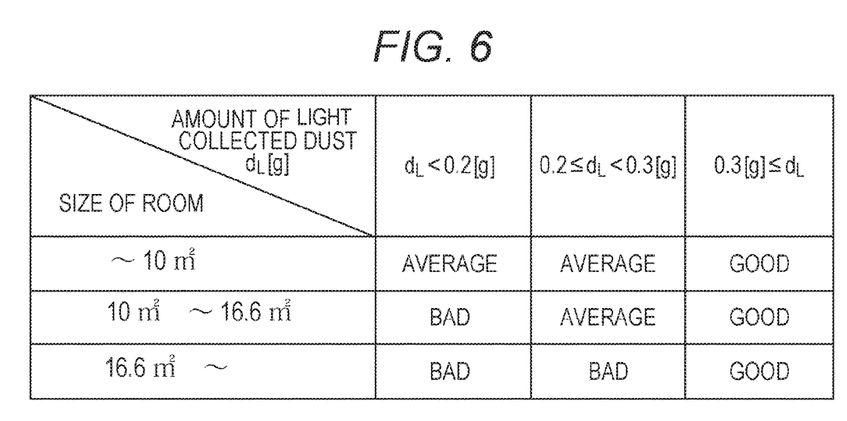
FIG. 6 illustrates the relationship among a size of a room, an amount of light dust, and dust collection efficiency of the dust removing apparatus according to the first exemplary embodiment.

FIG. 5 illustrates the relationship between the size of a room and an evaluation result by determination unit 104 with respect to an amount of collected heavy dust $d_H$ recorded in statistical information storage unit 103. FIG. 6 illustrates the relationship between the size of a room and an evaluation result by determination unit 104 with respect to an amount of collected light dust $d_L$ recorded in statistical information storage unit 103. For simplifying the description, FIGS. 5 and 6 show the case in which the statistical data corresponds to only the size of a room (that is, the air blowing pattern is constant).

For example, in the case where the measured amount of collected dust is less than the statistical data, determination unit 104 determines that the dust collection efficiency of dust removing apparatus 100 at the current installment position is "bad". On the other hand, in the case where the measured amount of collected dust is larger than the statistical data, determination unit 104 determines that the dust collection efficiency of dust removing apparatus 100 at the current installment position is "good". In the case where the measured amount of collected dust is almost equal to the statistical data, determination unit 104 may determine that the dust collection efficiency of dust removing apparatus 100 at the current installment position is "average".

For example, it is supposed that the size of the room estimated in ST102 is about 13 m². It is also supposed that the amount of collected light dust $d_L$ measured in ST102 is 0.1 [g], and the amount of collected heavy dust $d_H$ measured in ST103 is 0.6 [g]. In this case, as illustrated in FIG. 5, determination unit 104 determines that the dust collection efficiency of dust removing apparatus 100 for heavy dust is "bad". Further, as illustrated in FIG. 6, determination unit 104 determines that the dust collection efficiency of dust removing apparatus 100 for light dust is "bad". In this case, determination unit 104 determines that the current installment position of dust removing apparatus 100 is not appropriate. In other words, determination unit 104 determines that dust removing apparatus 100 cannot fully exhibit its intrinsic performance. Specifically, determination unit 104 determines that further dust collection is possible for the room whose size is about 13 $m^2$, considering the intrinsic performance of dust removing apparatus 100.

Notably, determination unit 104 may determine that the dust collection efficiency of dust removing apparatus 100 is "bad", when either one of the determination result (see FIG. 5) for an amount of collected heavy dust and the determination result (see FIG. 6) for an amount of collected light dust is determined to be "bad". Alternatively, determination unit 104 may determine the dust collection efficiency of dust removing apparatus 100 based on only the determination result of an amount of collected dust, for which dust collection efficiency is stressed, out of heavy dust and light dust. For example, in the case where a user places a priority on removal of pollens (one example of heavy dust), determination unit 104 determines that the dust collection efficiency of dust removing apparatus 100 is bad when the determination result (see FIG. 5) of an amount of collected heavy dust is determined to be "bad".

Returning to FIG. 2, output unit 105 displays an advice to the user in ST105 based on the determination result of determination unit 104 in ST104. For example, when the determination result in ST104 is "bad", output unit 105 makes a display indicating that the installment position of dust removing apparatus 100 is inappropriate. Output unit 105 may indicate that the installment position of dust removing apparatus 100 is inappropriate with a color of lamp or a message on a display, for example.

Thus, the user can recognize that the current installment position of dust removing apparatus 100 is inappropriate, and he/she can move the dust removing apparatus to another location.

When dust removing apparatus 100 is placed on a new place, dust removing apparatus 100 performs the processes in ST101 to ST105 illustrated in FIG. 2 to determine the dust collection efficiency of dust removing apparatus 100 at the new installment position. In the case where the determination result is "good", output unit 105 makes a display indicating that the installment position of dust removing apparatus 100 is appropriate. Thus, the user can recognize that the current installment position of dust removing apparatus 100 is appropriate.

Since dust removing apparatus 100 notifies the user of the evaluation of the dust collection efficiency at the installment position of dust removing apparatus 100 in this way, dust removing apparatus 100 can encourage the user to move dust removing apparatus 100 to a place where dust removing apparatus 100 can exhibit its intrinsic performance. Thus, dust removing apparatus 100 can efficiently remove dust at an appropriate installment position.

Notably, the statistical data of amounts of collected dust held in statistical information storage unit 103 is not limited to the one using only the size of a room as the usage condition of dust removing apparatus 100 as illustrated in FIGS. 5 and 6. For example, a combination of an air blowing pattern, layout information of a room, arrangement information of dust removing apparatus 100, the period (season) in which dust removing apparatus 100 is used, and activation statuses of other air current controllers may be used as the usage condition of dust removing apparatus 100. In this case, determination unit 104 acquires the statistical data in which the usage condition including an air blowing pattern, the layout of the room, and the installment position of dust removing apparatus 100 as well as the size of the room upon the dust collection in ST102 and ST103 are the same, and uses the statistical data for the comparison with the measured amount of collected dust. With this, dust removing apparatus 100 can compare the measured amount of collected dust to statistical data corresponding to more detailed usage conditions, whereby the precision in evaluating the dust collection efficiency of dust removing apparatus 100 can be enhanced.

In addition, determination unit 104 is not limited to using the statistical data having the identical usage condition to the usage condition for the measured amount of collected dust. Determination unit 104 may use statistical data having a usage condition with the same level similar to the usage condition upon the measurement, if there is not a usage condition identical to the usage condition for the measured amount of collected dust.

Dust removing apparatus 100 described above can notify a user, who has no proper knowledge of the installment position of dust removing apparatus 100, of whether the installment position of dust removing apparatus 100 is appropriate or not. Thus, dust removing apparatus 100 can efficiently perform dust removal.

Second Exemplary Embodiment

A dust removing apparatus according to the present exemplary embodiment has the similar basic configuration to dust removing apparatus 100 according to the first exemplary embodiment. Therefore, it will be described with reference to FIG. 1.

It is considered that an air current generated from an air current controller other than dust removing apparatus 100, such as an air conditioner or an electric fan, may block the air current expected by dust removing apparatus 100 to adversely affect the dust collection efficiency or such air current may exert good influence to the dust collection efficiency of dust removing apparatus 100 in cooperation with the air current from dust removing apparatus 100. As for an air conditioner, there are seasons (for example, summer (from July to September) and winter (from December to March) in Japan) in which it is frequently used and seasons in which it is less frequently used.

Therefore, the dust collection efficiency of dust removing apparatus 100 may differ between the season where an air conditioner is frequently used and the season where it is less frequently used, regardless of the same installment position. In other words, the appropriate installment position of dust removing apparatus 100 may differ based on the status of use of an air conditioner in the room.

In view of this, the present exemplary embodiment describes the case in which the dust collection efficiency of dust removing apparatus 100 is evaluated in consideration of the influence exerted on the dust collection efficiency of dust removing apparatus 100 by air current controllers other than dust removing apparatus 100, such as an air conditioner.

Note that the air current of an air conditioner which is one example of air current controllers is supposed to be steady. It is also supposed that the season where an air conditioner is frequently used (for example, from July to September and from December to March) and the season where the air conditioner is less frequently used (for example, from April to June and from October to November) are preliminarily set to dust removing apparatus 100 or input to dust removing apparatus 100 from a user or an external device.

It is also supposed that statistical information storage unit 103 in dust removing apparatus 100 stores the statistical data of amounts of collected dust of dust removing apparatus 100 in the season where an air conditioner is frequently used and the statistical data of amounts of collected dust in the season where an air conditioner is less frequently used.

Figure 7:
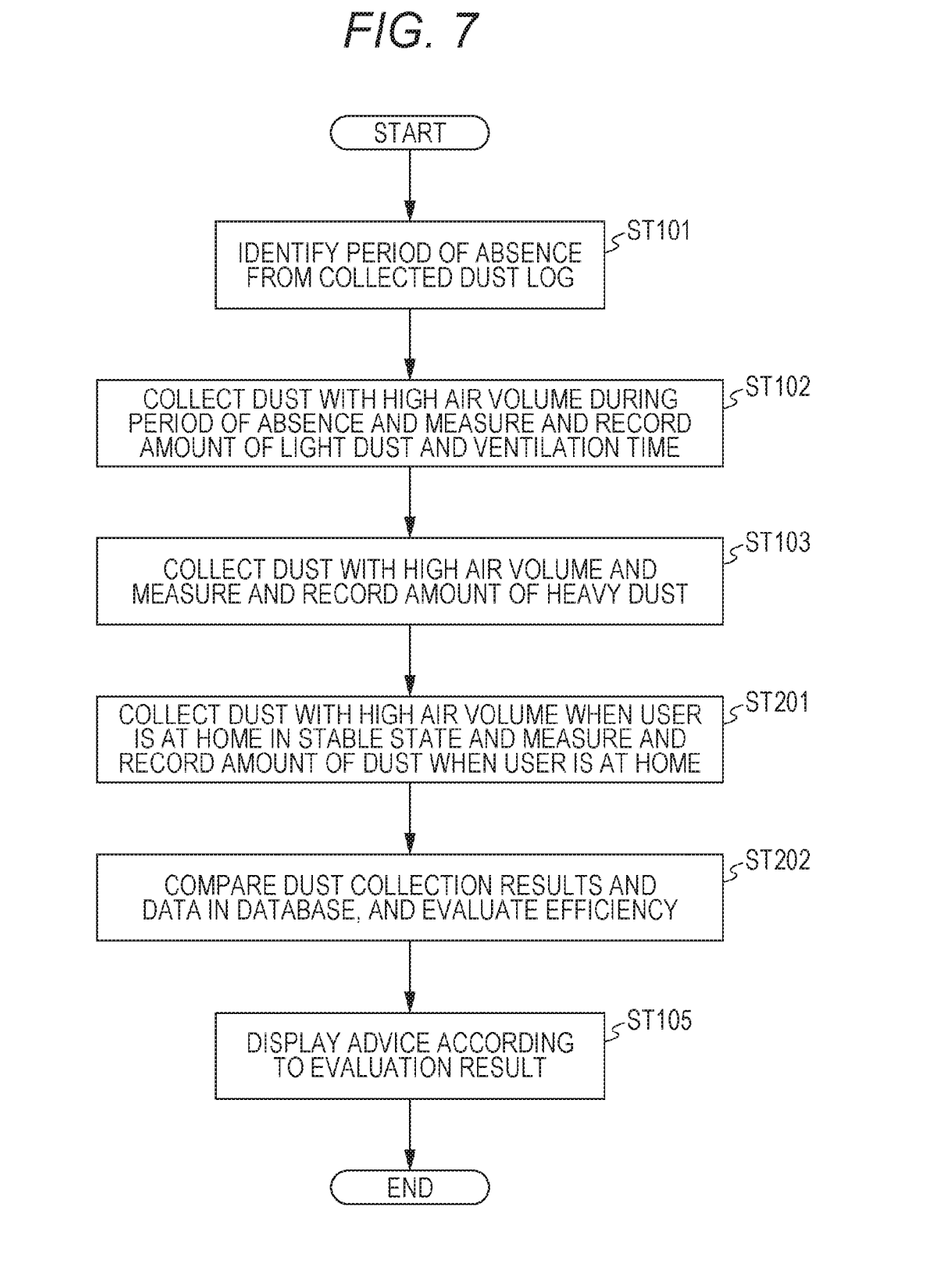
FIG. 7 is a flowchart illustrating one example of an operation of a dust removing apparatus according to a second exemplary embodiment.

FIG. 7 is a flowchart illustrating one example of the operation of dust removing apparatus 100 according to the present exemplary embodiment. Notably, in FIG. 7, the processes similar to those in the first exemplary embodiment (FIG. 2) are identified by the same reference numerals, and repeating of the description will be avoided.

The operation illustrated in FIG. 7 is executed in the season where an air conditioner is frequently used, for example.

In ST201, sensing unit 101 estimates an amount of collected dust in a stable state with a user being in the room in the season where the air conditioner is frequently used. Here, the stable state with the user being in the room means the state having less user's activities and no temporal disturbance (opening/closing of a window). For example, determination unit 104 may estimate the period in which the amount of collected dust when the user is in the room becomes an average as the period of the stable state with the user being in the room. In the stable state with the user being in the room, it is considered that the influence exerted on the dust collection efficiency of dust removing apparatus 100 by the air conditioner which is steadily activated is more greatly reflected.

In ST202, determination unit 104 compares the amount of collected dust in the stable state with the user being in the room measured in ST201 and the statistical data recorded in statistical information storage unit 103, in addition to the process in the first exemplary embodiment. The statistical data used for the comparison to the amount of collected dust in the stable state with the user being in the room is the data indicating the amount of collected dust in the stable state with the user being in the room in the season where the air conditioner is less frequently used.

Further, determination unit 104 compares the amount of collected dust during the absence of the user (above-mentioned period of absence) measured in ST102 and the statistical data recorded in statistical information storage unit 103. Notably, the period of the absence of the user is supposed to be the period in which the air conditioner is frequently used, but it is not used due to the absence of the user. The statistical data used for the comparison to the amount of collected dust during the period of absence of the user is the data indicating the amount of collected dust during the period of absence of the user in the season where the air conditioner is less frequently used.

Then, determination unit 104 evaluates the dust collection efficiency of dust removing apparatus 100 on the basis of the comparison result in the stable state with the user being in the room and the comparison result during the period of absence of the user. Specifically, determination unit 104 determines that the installment position of dust removing apparatus 100 is not appropriate, in the case where there is little difference (the difference falls within a predetermined range) in the amount of collected dust during the absence of the user between the season where an air conditioner is frequently used and the season where it is less frequently used, and the amount of collected dust when the user is at home in the season where the air conditioner is frequently used is smaller than the amount of collected dust when the user is at home in the season where it is less frequently used. Specifically, in this case, determination unit 104 determines that the dust collection efficiency of dust removing apparatus 100 is deteriorated due to the air current of the air conditioner.

In this case, in ST105, output unit 105 makes a display indicating that the current installment position of dust removing apparatus 100 is inappropriate or makes a display to encourage the user to change the installment position of dust removing apparatus 100.

Output unit 105 may also make a display to encourage the user to return the installment position of dust removing apparatus 100 to the original position after the end of the season where the air conditioner is frequently used (at the start of the season where the air conditioner is less frequently used).

As described above, in the season (first case) where other air current controller is used, dust removing apparatus 100 (determination unit 104) determines that the status of use of the dust removing apparatus in the first case is not appropriate, when the difference in the amount of collected dust measured during the period of absence of the user from the room (period of absence) between the first case and the season where the other air current controller is not used (second case) falls within a predetermined range, and the amount of collected dust measured during the presence of the user in the space in the first case is smaller than the amount of collected dust measured during the presence of the user in the space in the second case.

With this, dust removing apparatus 100 can notify the user of whether the installment position of dust removing apparatus 100 is appropriate or not, considering an air current generated from an air current controller other than dust removing apparatus 100. Thus, dust removing apparatus 100 can efficiently perform dust removal based on the status of use of an air current controller other than dust removing apparatus 100.

The present exemplary embodiment describes the case where the dust collection efficiency of dust removing apparatus 100 is evaluated when the other air current controller is used. However, the same is applied to the case where the dust collection efficiency of dust removing apparatus 100 is evaluated when other air current controller is not used. That is, dust removing apparatus 100 determines that the status of use of the dust removing apparatus in the case where the other air current controller is not used is not appropriate, when the difference in the amount of collected dust during the absence of the user in the room between the case where the other air current controller is not used and the case where it is used falls within a predetermined range, and the amount of collected dust measured during the presence of the user in the space in the case where the other air current controller is not used is smaller than the amount of collected dust measured during the presence of the user in the space in the case where the other air current controller is used. For example, in the case where the combination of the air current generated from the other air current controller and the air current generated from dust removing apparatus 100 is effectively exerted on the dust collection efficiency of dust removing apparatus 100, the dust collection efficiency of dust removing apparatus 100 is deteriorated in the season where the other air current controller is not used. Therefore, dust removing apparatus 100 may notify the user to move dust removing apparatus 100 to a more appropriate position.

Further, the present exemplary embodiment supposes the state in which the other air current controller is not used during the period of absence of the user. However, the present exemplary embodiment is also applicable to the state in which the other air current controller is used during the period of absence of the user, such as 24-hour air conditioning or 24-hour ventilation. For example, in the case where the other air current controller is used for a long time such as for one year, such state is considered to be the steady state of the target room. Therefore, whether the installment position is appropriate or not can be determined with the method as in the first exemplary embodiment. Further, in another case in which both the period in which an air current controller such as 24-hour air conditioning is used and the period in which it is not used are present depending on seasons, dust removing apparatus 100 can determine whether the other air current controller activated for 24 hours provides a good influence on the dust collection efficiency or adversely affects the dust collection efficiency through the comparison in the amount of collected dust between the period in which the other air current controller is used and the period in which it is not used.

Third Exemplary Embodiment

A dust removing apparatus according to the present exemplary embodiment has the similar basic configuration to dust removing apparatus 100 according to the first exemplary embodiment. Therefore, it will be described with reference to FIG. 1.

The present exemplary embodiment describes the case where dust removing apparatus 100 evaluates an air blowing control of dust removing apparatus 100 as well as the installment position of dust removing apparatus 100 as in the first or second exemplary embodiment.

The evaluation of the air blowing control of dust removing apparatus 100 means that the dust collection efficiency of dust removing apparatus 100 is determined in each combination of blowing patterns (for example, air volume, direction of air, timing, and blowing time) that can be set. This enables the notification of the air blowing using the optimal air blowing patter at the current installment position of dust removing apparatus 100 to the user, and enables the air blowing control for switching to the optimal air blowing pattern.

The operation of dust removing apparatus 100 according to the present exemplary embodiment will specifically be described below.

Determination unit 104 compares the measured amount of collected dust and the statistical data using the air blowing pattern preliminarily set in the same manner as in the first or second exemplary embodiment. When the comparison result shows "bad", determination unit 104 sets the other air blowing pattern, and causes sensing unit 101 to again measure the amount of collected dust. Then, determination unit 104 again compares the measured amount of collected dust and the statistical data. When the comparison result between the amount of collected dust which is again measured and the statistical data is "bad", determination unit 104 again sets the air blowing pattern, and repeats the comparison between the amount of collected dust and the statistical data.

On the other hand, when the comparison result between the measured amount of collected dust and the statistical data is "good", determination unit 104 determines that the air blowing pattern which is now set is the air blowing pattern appropriate for the current installment position of dust removing apparatus 100.

Determination unit 104 also estimates the layout around dust removing apparatus 100 on the basis of the content of the air blowing pattern (direction of air) set when the comparison result is determined to be "bad". For example, in the case where the comparison result is determined to be "bad" for air blowing in a certain direction, determination unit 104 determines that an obstacle such as a rack or wall is present in this direction. Then, output unit 105 may display that the installment position of dust removing apparatus 100 is not appropriate, and further display that an obstacle adversely affecting the dust collection efficiency is present in the direction at the installment position of dust removing apparatus 100.

As described above, dust removing apparatus 100 according to the present exemplary embodiment can notify a user of the evaluation of the dust collection efficiency under the status of use of dust removing apparatus 100 in consideration of an air blowing patter as well as an installment position. Thus, a user who does not have proper knowledge can determine whether the installment position and air blowing pattern of dust removing apparatus 100 are appropriate or not. Thus, dust removing apparatus 100 can efficiently perform dust removal.

Further, determination unit 104 may determine the air blowing pattern by which the amount of collected dust is large as the air blowing pattern appropriate for the current installment position of dust removing apparatus 100, out of air blowing patterns which can be set. Then, dust removing apparatus 100 (for example, an air blowing control unit not illustrated) may control air blowing using the air blowing pattern which is determined to be appropriate by determination unit 104.

As described above, according to dust removing apparatus 100 in the present exemplary embodiment, sensing unit 101 measures an amount of collected dust in the case where air blowing is performed in a plurality of air blowing patterns; determination unit 104 determines whether each of the air blowing patterns is appropriate or not through the comparison between the amounts of collected dust measured with the air blowing patterns and the statistical data under the usage condition identical to the usage condition of each of the air blowing patterns; and output unit 105 displays the air blowing pattern which is determined to be inappropriate.

In this way, dust removing apparatus 100 searches the air blowing pattern by which the amount of collected dust with dust removing apparatus 100 is increased. With this, dust removing apparatus 100 implements not only the notification of whether the installment position is appropriate or not but also the optimization of the air blowing control at the current installment position of dust removing apparatus 100, thereby being capable of efficiently performing dust removal.

Notably, the present exemplary embodiment is also applicable to a dust collection system in cooperation with multiple devices that aims to enhance the dust collection efficiency of dust removing apparatus 100 through the air current control with the combination of dust removing apparatus 100 (for example, air purifier) and other air current controller (for example, air conditioner). With this, whether the installment position of dust removing apparatus 100 in a dust collection system in cooperation with multiple devices is appropriate or not can be notified to a user, or the air blowing control of dust removing apparatus 100 can be optimized.

As described above, each exemplary embodiment according to the present disclosure has been described above.

Notably, in the above exemplary embodiments, the determination result (for example, see FIGS. 5 and 6) of dust removing apparatus 100 is any one of "bad", "average", and "good". However, dust removing apparatus 100 may indicate the determination result of the dust collection efficiency in multiple levels in each of "bad", "average", and "good". For example, dust removing apparatus 100 may classify the degree of "bad" determination result of the dust collection efficiency in more detailed manner for a user. With this, in the case where a user is in the room where the determination result is always "bad" for any installment position, dust removing apparatus 100 can display to this user the best installment position out of the installment positions which are determined to be "bad". Thus, the dust collection efficiency of dust removing apparatus 100 can be enhanced.

Further, the above exemplary embodiments describe that the period of absence of a user is identified on the basis of a dust collection log (amount of collected dust) by dust removing apparatus 100. However, the method for identifying the period of absence of a user is not limited thereto. For example, dust removing apparatus 100 may receive an input from a user when he/she is out and when he/she returns home, and may identify the period between the timings at which the respective input operations are received as the period of absence. Alternatively, dust removing apparatus 100 may identify the period of absence of a user on the basis of the detection result of a motion sensor provided inside or outside dust removing apparatus 100.

Further, the above exemplary embodiments describe that statistical data in each usage condition is used as an estimated value (that is, determination criterion of determination unit 104) of an amount of collected dust under an appropriate status of use for each usage condition under which dust removing apparatus 100 is placed. However, the estimated value serving as the determination criterion is not limited to the statistical data. For example, it may be the result obtained through a calculator simulation or may be measured data which is measured once under an ideal status of use (ideal environment) under each usage condition. Further, not only the data stored in statistical information storage unit 103 in dust removing apparatus 100 but also data in a cloud connected through a network may be used. In addition, a status of use at home can be stored in a cloud to enhance precision of statistical data.

Further, the above exemplary embodiments describe that dust removing apparatus 100 collects dust in a room. However, also in the case where dust removing apparatus 100 discharges dust in a room to the outside, the dust collection efficiency of dust removing apparatus 100 can be evaluated in the same manner as in the above exemplary embodiments.

SUMMARY OF PRESENT DISCLOSURE

A dust removing apparatus according to the present disclosure comprising: an air blower which, in operation, performs air blowing; an air sucker which, in operation, performs air suction from a space in which the air blowing is performed to collect dust from the space; a sensor which, in operation, measures an amount of the collected dust, the amount of dust indicating a density of the collected dust; a processor which, in operation, determines whether or not a usage condition of the dust removing apparatus in the space is appropriate by comparing the measured amount of collected dust with an estimated value of an amount of collected dust under a usages condition of the dust removing apparatus satisfying a predetermined appropriate use criteria upon the measurement of the amount of collected dust; and an outputter which, in operation, outputs information indicating the result of the determined usage condition.

The dust removing apparatus according to the present disclosure, further comprising a storage which, in operation, stores an estimated value of an amount of collected dust under a usage condition satisfying a predetermined appropriate use criteria for each usage condition under which the dust removing apparatus is placed, wherein the processor determines whether or not a usage condition of the dust removing apparatus is appropriate by comparing the measured amount of collected dust with the estimated value under a usage condition identical to the usage condition during the measurement of the amount of collected dust.

In the dust removing apparatus according to the present disclosure, the estimated value includes a first estimated value for dust having a particle diameter less than a first threshold, and a second estimated value for dust having a particle diameter equal to or larger than the first threshold.

In the dust removing apparatus according to the present disclosure, the processor compares an amount of collected dust that is measured during a first period in which a human is absent from the space with the first estimated value.

In the dust removing apparatus according to the present disclosure, the first period includes a time period in which the measured amount of collected dust is the minimum.

In the dust removing apparatus according to the present disclosure, the processor compares an amount of collected dust that is measured during a second period with the second estimated value, the second period starting from the timing at which a human is detected in the space which has been unoccupied.

In the dust removing apparatus according to the present disclosure, the timing is defined as the timing at which a variation amount of the measured amount of collected dust within a predetermined time length becomes equal to or larger than a third threshold, wherein the measured amount of collected dust before the variation occurs is less than a second threshold.

In the dust removing apparatus according to the present disclosure, the processor estimates a size of the space based on an air volume of the air blowing and a time length from a timing at which a human is absent from the space till the measured amount of collected dust becomes less than a fourth threshold, and determines whether a usage condition of the dust removing apparatus is appropriate or not by comparing an amount of collected dust that is measured during a predetermined period with the estimated value under a usage condition including a size of a space identical to the estimated size of the space.

In the dust removing apparatus according to the present disclosure, in a first operation period in which an air current controller is used if a human is present in the space, the processor determines that a usage condition of the dust removing apparatus in the first operation period is inappropriate, when a difference in the amount of collected dust that is measured during absence of a human from the space between the first operation period and a second operation period in which the air current controller is not used even if the human is present in the space falls within a predetermined range, and when the amount of collected dust that is measured during presence of a human in the space in the first operation period is smaller than the amount of collected dust that is measured during presence of a human in the space in the second operation period.

The dust removing apparatus according to the present disclosure further comprising a recorder which, in operation, records the measured amount of collected dust in association with an air blowing pattern upon measurement, wherein the processor determines whether or not a usage condition of the dust removing apparatus is appropriate by comparing an amount of collected dust that is measured during a predetermined period with the estimated value under a usage condition including a pattern identical to the air blowing pattern during the measurement.

In the dust removing apparatus according to the present disclosure, the usage condition is an installment position of the dust removing apparatus in the space.

In the dust removing apparatus according to the present disclosure, the usage condition is the air blowing pattern, the sensor measures the amount of collected dust when the air blowing is performed with a plurality of patterns, and the processor determines whether or not each of the plurality of patterns is appropriate by comparing an amount of collected dust measured with each of the plurality of patterns and the estimated value under a usage condition identical to each of the plurality of patterns.

The dust removing apparatus according to the present disclosure further includes a controller which, in operation, controls the air blowing using the pattern which is determined to be appropriate by the processor.

A notification method according to the present disclosure is a notification method performed by a dust removing apparatus, comprising: performing air blowing and air suction from a space in which the air blowing is performed to collect dust in the space; measuring an amount of the collected dust which indicates a density of the collected dust; determining whether or not a usage condition of the dust removing apparatus in the space is appropriate through comparison between the measured amount of collected dust and an estimated value of an amount of collected dust under a usage condition of the dust removing apparatus satisfying a predetermined appropriate use criteria upon the measurement of the amount of collected dust; and outputting information indicating the result of the determined usage condition for notifying a user of whether a usage condition of the dust removing apparatus is appropriate or not.

The above exemplary embodiments describe that the present disclosure is implemented with hardware. However, the present disclosure is implemented with software in cooperation with hardware.

One aspect of the present disclosure is useful for a dust removing apparatus.

What is claimed is:

1. A dust removing apparatus comprising:
an air blower configured to perform air blowing in a space;
an air sucker configured to collect dust by performing air suction from the space in which the air blowing is performed;
a sensor configured to measure an amount of dust collected by the air sucker; and
a processor configured to determine a first period in which a user is absent in the space; and
an output interface,
wherein
the air sucker collects dust during the first period,
the sensor measures a first amount of dust collected by the air sucker during the first period,
the processor is configured to perform a comparison between the measured first amount of dust collected during the first period and an estimated amount of dust, which is estimated to be collected under a usage condition in which the user is absent in the space, and
the output interface outputs information indicating whether or not a usage status of the dust removing apparatus is appropriate based on a result of the comparison.

2. The dust removing apparatus according to claim 1, further comprising a storage unit which stores a plurality of usage conditions in which the dust removing apparatus is placed, and an estimated amount of dust collected under each of the plurality of usage conditions, wherein the processor is configured to determine whether or not the usage status of the dust removing apparatus is appropriate based on a comparison between the measured amount of dust collected under a first usage condition, with the estimated amount of dust collected under a second usage condition stored in the storage unit, the second usage condition being identical to the first usage condition.

3. The dust removing apparatus according to claim 1, wherein the estimated amount of dust includes a first estimated value for dust having a particle diameter less than a diameter threshold, and a second estimated value for dust having a particle diameter equal to or larger than the diameter threshold.

4. The dust removing apparatus according to claim 1, wherein the processor is configured to determine a period in which the measured amount of dust is the minimum, as the first period in which the user is absent in the space.

5. The dust removing apparatus according to claim 3, wherein the processor is configured to compare the measured amount of dust collected during a second period with the second estimated value, the second period starting from a time at which a user is detected in the space.

6. The dust removing apparatus according to claim 5, wherein the time is defined as a time at which a variation in the measured amount of dust becomes equal to or larger than a predetermined threshold.

7. The dust removing apparatus according to claim 2, wherein the processor is configured to estimate a size of the space based on an air volume of the air blowing and a time length from a time at which a user is absent in the space till the measured amount of dust becomes less than a predetermined threshold, and the processor is configured to determine whether or not the usage status of the dust removing apparatus is appropriate by comparing the measured amount of dust with the estimated amount of dust collected under a usage condition including the estimated size of the space.

8. The dust removing apparatus according to claim 1, wherein in a first operation period in which an air current controller is used when a user is present in the space, the processor is configured to determine that the usage status of the dust removing apparatus in the first operation period is inappropriate, when a difference in the measured amount of dust collected during absence of a user in the space between the first operation period and a second operation period in which the air current controller is not used when the user is present in the space falls within a predetermined range, and when the measured amount of dust collected during presence of a user in the space in the first operation period is smaller than the measured amount of dust collected during presence of a user in the space in the second operation period.

9. The dust removing apparatus according to claim 2, further comprising a recorder configured to record the measured amount of dust in association with an air blowing pattern upon measurement, wherein
the processor is configured to determine whether or not the usage status of the dust removing apparatus is appropriate by comparing the measured amount of dust collected during a predetermined period with the estimated amount of dust collected under a usage condition including the air blowing pattern during the measurement.

10. The dust removing apparatus according to claim 1, wherein the usage status comprises an installment position of the dust removing apparatus in the space.

11. The dust removing apparatus according to claim 2, wherein
the plurality of usage conditions comprise an air blowing pattern,
the sensor measures the amount of dust collected when the air blowing is performed with a plurality of patterns, and
the processor is configured to determine whether or not each of the plurality of patterns is appropriate by comparing the measured amount of dust collected with each of the plurality of patterns and the estimated amount of dust collected under a usage condition including each of the plurality of patterns.

12. The dust removing apparatus according to claim 11, further comprising a controller configured to control the air blowing using the pattern which is determined to be appropriate by the processor.

13. The dust removing apparatus according to claim 1, wherein the first period in which a user is absent in the space includes a case in which an air current controller is steadily used.

14. A notification method performed by a dust removing apparatus, comprising:
performing air blowing in a space;
determining a first period in which a user is absent in the space;
collecting dust by performing air suction from the space during the first period in which a user is absent in the space in which the air blowing is performed;
measuring an amount of the dust collected by performing the air suction in the space during the first period;
determining whether or not a usage status of the dust removing apparatus in the space is appropriate based on a comparison between the measured amount of dust collected in the first period and an estimated amount of dust, which is estimated to be collected under a usage condition in which the user is absent in the space; and
outputting information indicating whether or not the usage status of the dust removing apparatus is appropriate based on a result of the comparison.

* * * * *